F. SKABROUD.
GAGE KNIFE.
APPLICATION FILED OCT. 5, 1908.

929,171.

Patented July 27, 1909.

Witnesses
John T. Burch
Ezra Nat Hill

Inventor
Frank Skabroud
By Max. A. Schmidt
Attorney

UNITED STATES PATENT OFFICE.

FRANK SKABROUD, OF OSHKOSH, WISCONSIN.

GAGE-KNIFE.

No. 929,171. Specification of Letters Patent. Patented July 27, 1909.

Application filed October 5, 1908. Serial No. 456,154.

*To all whom it may concern:*

Be it known that I, FRANK SKABROUD, a subject of the Emperor of Austria-Hungary, residing at Oshkosh, in the county of Winnebago and State of Wisconsin, have invented certain new and useful Improvements in Gage-Knives, of which the following is a specification.

This invention relates to that class of knives known as gage-knives which are employed for paring vegetables such as cucumbers, potatoes, etc., and the object of the present invention is to provide a knife of this kind which is simple in construction, easy to handle, and efficient in operation.

The invention is illustrated in the accompanying drawing in which—

Figure 1:
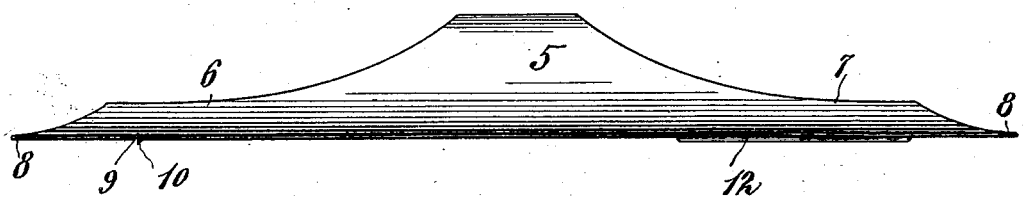
Figure 2:
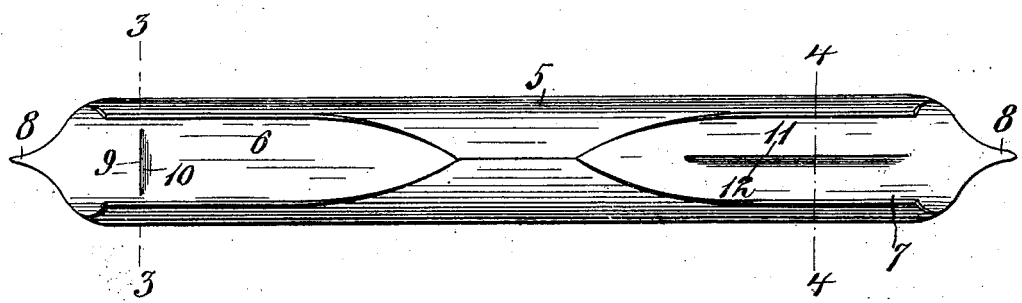
Figure 3:
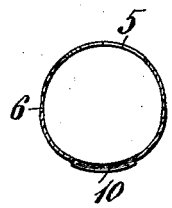
Figure 4:
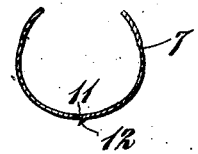

Figure 1 is a side elevation thereof, and Fig. 2 a plan view. Fig. 3 is a cross-section on the line 3—3 of Fig. 2. Fig. 4 is a cross-section on the line 4—4 of Fig. 2.

Referring more particularly to the drawing, it will be seen that the knife comprises an elongated body consisting of a cylindrical middle portion 5, and concavo-convex end-portions 6 and 7, respectively, each of which terminates in a point 8. In the end portion 6 is a transverse slot 9 having one of its edges bent outwardly and projecting beyond the convex side of said end-portion, to form a convex cutting-lip 10. In the end-portion 7 is a longitudinal slot 11 which has one of its edges bent outwardly and projecting beyond the convex side of said end-portion, to form a cutting-lip 12.

In use, the middle cylindrical portion serves as the handle of the knife, and the cutting-lip 12 is pressed against the vegetable and carried across the same so as to pare off the skin in thin strips which will be of uniform thickness. If the vegetable is irregular in outline, or formed with hollows, the transverse cutting-lip 10 will be employed. Blemishes, the eyes of potatoes, etc. will be removed by the points 8.

From the foregoing it will be seen that the knife is easy to operate, and efficient in operation, and by means of the transverse cutting-lip 10 all portions of the surface of the vegetable may be readily reached no matter how irregular the same may be. The knife is simple in construction, and therefore can be cheaply produced and sold. It is preferably made of sheet-metal which is stamped and bent to the required shape, the meeting edges of the sheet being connected in any suitable manner.

I claim:

1. A gage-knife comprising an elongated body having an intermediate cylindrical handle portion, and integral concavo-convex end-portions, a longitudinal cutting lip on one of said end-portions, and a transverse cutting-lip on the other end-portion.

2. A gage-knife comprising an elongated body having an intermediate handle-portion, and concavo-convex end-portions, a longitudinal cutting-lip on one of said end-portions, and a transverse cutting-lip on the other end-portion.

In testimony whereof I affix my signature in presence of two witnesses.

FRANK SKABROUD.

Witnesses:
R. J. REINE,
CHAS. OELLERICH.